United States Patent [19]

Mizukoshi et al.

[11] Patent Number: 5,682,562
[45] Date of Patent: Oct. 28, 1997

[54] DIGITALLY CONTROLLED QUENCH FLASH CIRCUIT

[75] Inventors: Seiichi Mizukoshi, Chigasaki; Masaki Izumi, Yokohama, both of Japan; John K. Lynch, Kendall, N.Y.; John J. Uebelacker; Kenneth A. Parulski, both of Rochester, N.Y.; Clay A. Dunsmore, Fairport, N.Y.

[73] Assignee: Eastman Kodak Company, Rochester, N.Y.

[21] Appl. No.: 648,648

[22] Filed: May 16, 1996

[51] Int. Cl.⁶ ............................................. G03B 15/05
[52] U.S. Cl. ............................................. 396/159
[58] Field of Search ........................ 354/416, 417; 315/241 P, 151; 396/159–163

[56] References Cited

U.S. PATENT DOCUMENTS

| 3,840,882 | 10/1974 | Kawasaki | 354/33 |
| 3,868,701 | 2/1975 | Kawasaki | 354/416 X |
| 4,012,665 | 3/1977 | Nakamura et al. | 315/241 P |
| 4,266,163 | 5/1981 | Lloyd | 315/151 |
| 4,809,030 | 2/1989 | Takagi et al. | 354/414 |
| 4,887,118 | 12/1989 | Gaesky | 354/413 |
| 5,101,335 | 3/1992 | Ludden et al. | 363/21 |
| 5,134,431 | 7/1992 | Ishimura et al. | 354/400 |
| 5,138,361 | 8/1992 | Iwamoto et al. | 354/417 |

FOREIGN PATENT DOCUMENTS

| 57-129423 | 8/1982 | Japan | G03B 7/16 |
| 58-058529 | 4/1983 | Japan | G03B 15/05 |
| 2072359 | 9/1981 | United Kingdom | G03B 15/05 |
| WO82/01079 | 4/1982 | WIPO | G03B 7/083 |

Primary Examiner—W. B. Perkey
Attorney, Agent, or Firm—David M. Woods

[57] ABSTRACT

A flash quench controller for a camera having a flash unit includes a light detector for producing a signal, an integrator for integrating the signal from the detector and producing an integrated signal, a comparator for comparing the integrated signal to a reference value, and means for quenching the flash unit when the integrated signal reaches the reference value. By using a pulse signal having a variable pulse width to programmably set the reference value, many different quench time values can be easily established. The flash unit may also be quenched by setting a maximum flash time value. The flash is automatically quenched if this flash time value is reached before the integrated signal level reaches the programmed reference value.

16 Claims, 8 Drawing Sheets

DIGITALLY CONTROLLED QUENCH FLASH CIRCUIT

FIELD OF THE INVENTION

The invention relates to an electronic flash circuit for a camera, and in particular, to a quenched flash circuit for an electronic camera.

BACKGROUND OF THE INVENTION

Figure 1:
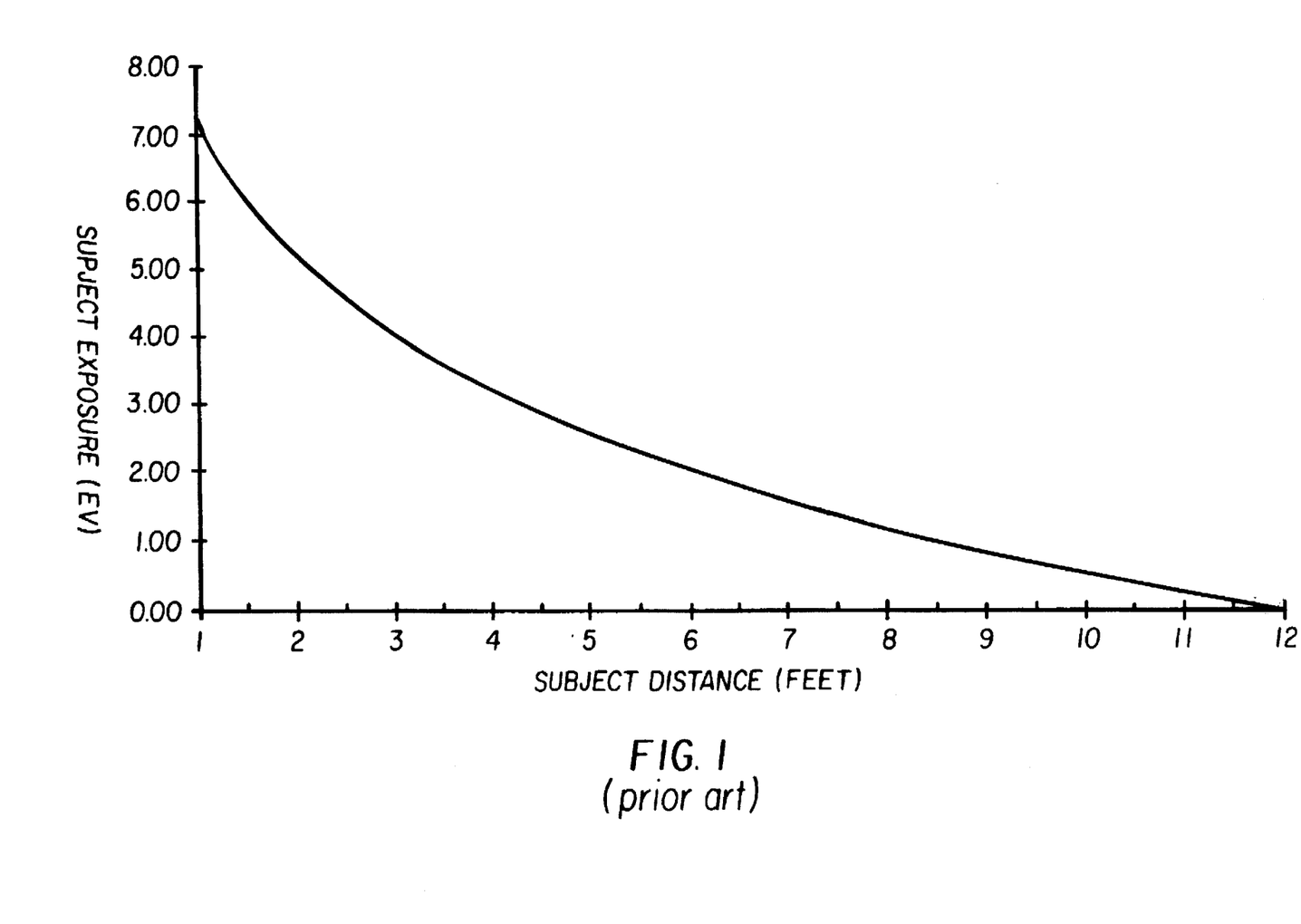
FIG. 1 is a graph of light energy output versus distance for an electronic flash unit.

"Quenched flash" designs have been used for many years in film cameras. A quench circuit is used to stop, or "quench" the light output from a camera flash tube when the sensor (i.e., photographic film) exposure has reached an acceptable level. This is required because the subject illumination resulting from the light output of a camera flash is approximately inversely proportional to the square of the distance between the camera and the subject, as shown in FIG. 1. Thus, if the subject is relatively close to the camera, the total flash output light energy should be much smaller than if the subject is farther away. A quench circuit is used to decide when the film exposure is adequate, so that the flash light output can be halted at the appropriate time. The same principles apply if the sensor is a solid-state charge coupled device (CCD) image sensor.

Figure 2:
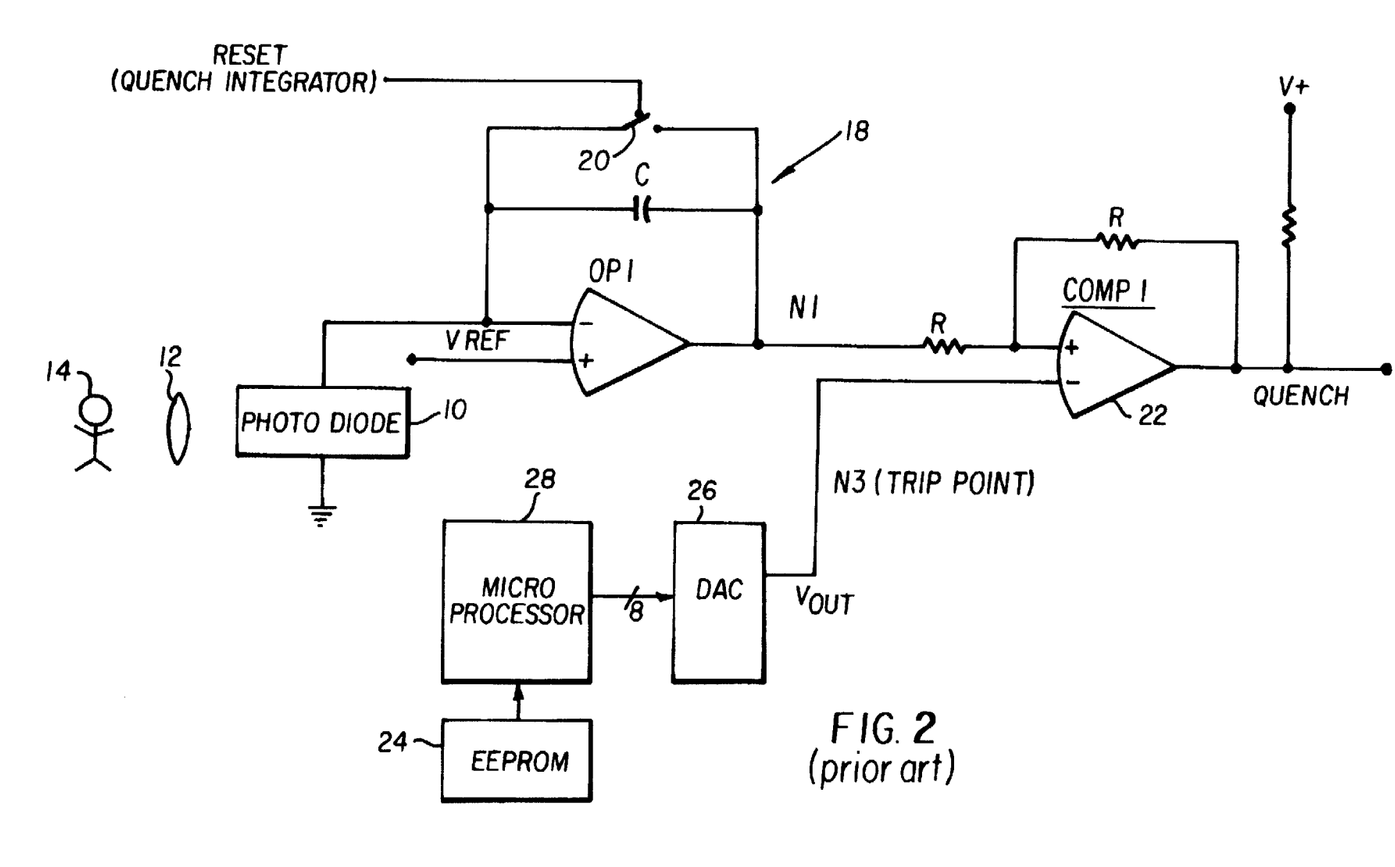
FIG. 2 is a quench circuit known from the prior art.

A typical prior art quench circuit is shown in FIG. 2. A photodiode 10 mounted on the front of a camera has a current output that is linearly related to the illumination level. A lens 12 images a subject 14 onto the photodiode 10. When the flash is fired, the photodiode output is integrated by a light integrator 18 in order to measure the reflected light energy from the subject. Just before the flash is fired, the integrator 18 is reset (by activation of a reset switch 20) so that it measures only the light energy during the sensor exposure period. The integrated voltage signal (N1) from the photodiode is applied to a quench control comparator 22, where it is compared to a trip point voltage (N3). When N1<N3, the comparator 22 produces a quench signal that is low (digital 0), and the flash continues to emit light. When the N1 voltage signal becomes greater than the N3 voltage, the quench signal is high, and the flash is thereupon "quenched" to halt the light output.

The trip point voltage N3 may need to be varied, for example to account for differences in the sensitivity or "photographic speed" of the photographic film. If a slower speed (e.g., ISO 100) film is used, the N3 voltage should be relatively larger than if the camera is loaded with a higher speed (e.g. ISO 400) film. In the prior art, for example, as generally described in U.S. Pat. No. 5,134,431, a microprocessor controlled camera system is used in which multiple flash quench levels are stored in an EEPROM memory 24. These parameters are used to set the flash quench detection circuit reference level, i.e., the trip point voltage. In this type of circuit, the quench control comparator 22 uses a trip point set by a digital/analog (D/A) converter 26, which changes based on the film speed input from a camera microprocessor 28. Each quench level value stored in EEPROM memory 24 may be determined and programmed during manufacture to correct for tolerances in the quench photodiode 10 or other circuit components. Unfortunately, in order to use a large number of flash quench levels, an equally large number of EEPROM memory locations and manufacturing calibration steps are needed.

In order to accurately accommodate not only differences in photographic speed but also differences in the camera lens f-number, the trip voltage N3 must be programmable over a relatively wide range of values. This requires that the D/A converter 26 have, for example, an 8-bit digital input, to provide $2^8$ or 256 possible analog output values for N3. In addition, the D/A converter 26 must incorporate circuitry to ensure that the N3 voltage is independent of any voltage variations typical of digital signals from the microprocessor 28.

As a result of the need for an accurate D/A conversion and multiple (e.g. 8) digital signal lines between the processor 28 and the D/A converter 26, the prior art circuit shown in FIG. 2 is more expensive, larger, and consumes more power than is desirable.

In some photographic situations, the distance between the camera flash and the subject is accurately known. This distance can be provided by some autofocus systems or by the user inputting a measured distance to the camera. In this situation, more precise flash exposures may be obtained by discharging the flash for the appropriate period of time, instead of quenching the flash using the reflected light from the scene. What is needed is an improved way of precisely controlling the flash level, using lower cost components, and allowing the flash to be quenched either as a function of the reflected light from the subject or as a function of the distance between the subject and flash.

SUMMARY OF THE INVENTION

The present invention is directed to overcoming one or more of the problems set forth above. Briefly summarized, according to one aspect of the present invention, a flash quench controller for a camera having a flash unit includes a light detector for producing a signal, an integrator for integrating the signal from the detector and producing an integrated signal, a comparator for comparing the integrated signal to a reference value, and means for quenching the flash unit when the integrated signal reaches the reference value. The reference value is programmably set by using a pulse signal having a variable pulse width, wherein the pulse width of the pulse signal varies the reference value.

One advantageous effect of the invention is based on integrating a pulse signal having a variable pulse width to programmably set the reference value, such that many different quench time values can be easily established, using low cost components. A second advantage is that the pulse width values used for any particular camera can be modified using a single correction factor stored in EPROM, to compensate for any differences in the characteristics of the low cost components. A third advantage is that the flash may also be quenched after a period of time that may be related to the distance between the subject and the camera.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 3:
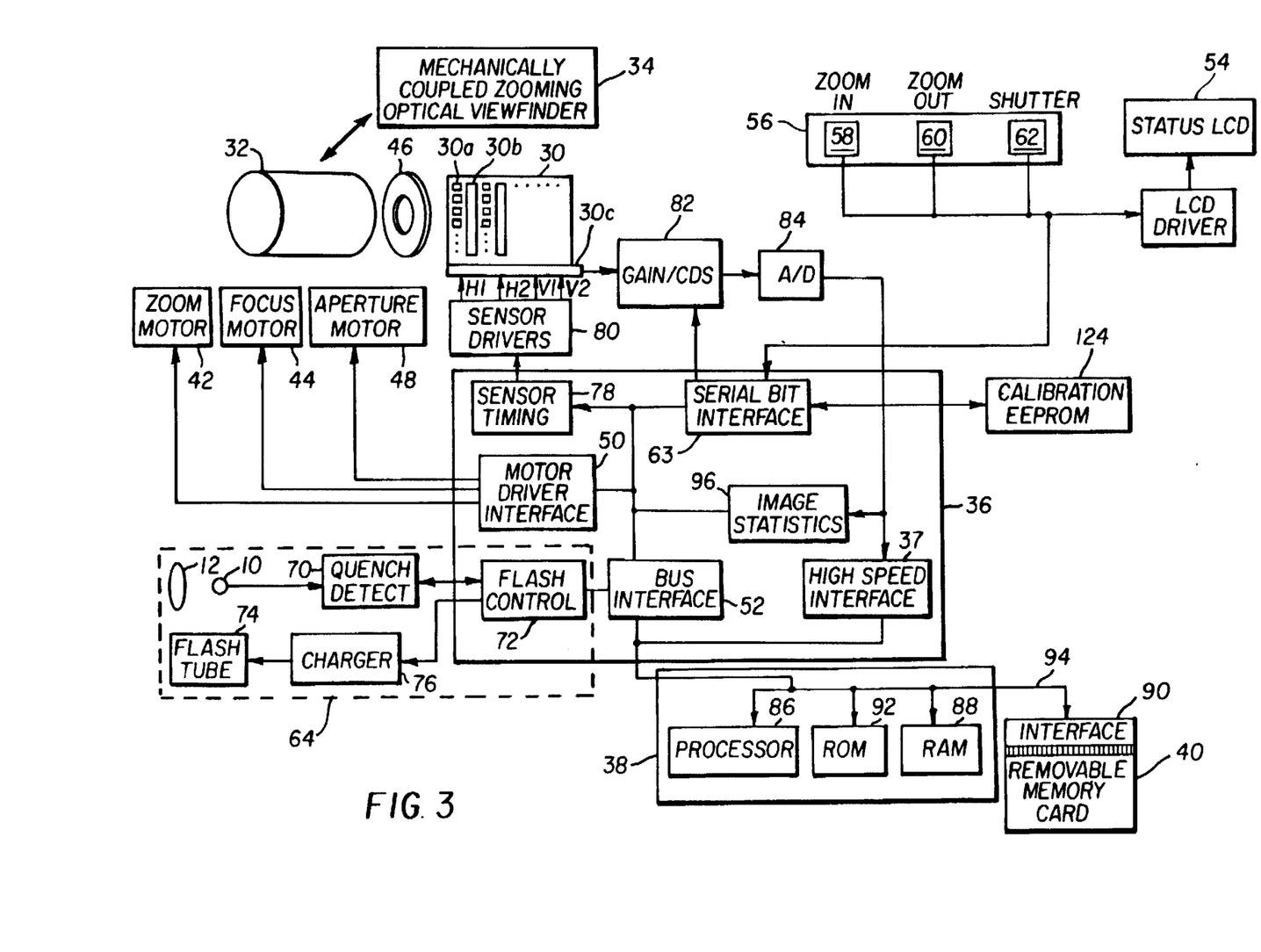
FIG. 3 is a block diagram of an electronic camera incorporating a digitally controlled quench flash circuit according to the invention.

A block diagram of a camera incorporating a quench circuit according to the invention is shown in FIG. 3. The camera includes a CCD image sensor 30, a motor driven zoom lens 32 for focusing the image light upon the image sensor 30, and a zooming optical viewfinder 34 mechanically coupled to the zoom lens 32 for composing the images before they are captured by the image sensor 30. The camera operations, particularly capture, are controlled by a timing and control section 36. The captured image data is passed through a high speed interface 37 in the timing and control section 36, processed in a processor section 38, and stored in a removable memory card 40. The motor driven zoom lens 32 includes a zoom motor 42, a focus motor 44, and a variable aperture 46 driven by an aperture motor 48, which are all controlled by a motor driver interface circuit 50 in the timing and control section 36. The interface circuit 50 is in turn controlled by the processor section 38 via a bus interface 52.

The camera includes a status display 54, for example, a liquid crystal (LCD) display, and a user control section 56 having a number of user control buttons, including "zoom in" and "zoom out" buttons 58 and 60, and a capture button 62. The signals from the control section 56 are applied to the timing and control section 36 through a serial bit interface 63. The camera further includes a flash unit 64, which in turn includes the lens 12 for directing subject light upon the photodiode 10 connected to an analog quench detect circuit 70. A digital flash control circuit 72 in the flash unit 64 is interconnected between the analog quench detect circuit 70 and the bus interface 52 in the timing and control section 36. The flash control circuit 72 also controls a flash tube 74 via a flash charger circuit 76.

Control of the sensor is provided by the timing and control section 36, which is an application specific integrated circuit (ASIC) with processing and timing functions for both ambient and flash capture operating modes. For instance, the timing and control section 36 includes a sensor timing circuit 78 for controlling the image sensor functions. The sensor timing circuit 78 provides the signals to enable sensor drivers 80, which provide horizontal clocks (H1, H2), and vertical clocks (V1, V2) to drive the sensor 30. The output of the image sensor 30 is amplified and processed in a variable analog gain and sampling (correlated double sampling (CDS)) circuit 82, and converted to digital form in an A/D converter stage 84. The A/D output signal is provided to the processor section 38, which includes a digital processor 86 and a RAM memory 88 for temporarily storing the still images. The digital processor 86 then performs image processing on the still images, and finally stores the processed images on the removable memory card 40 via a memory card interface circuit 90, which may use the PCMCIA 2.0 standard interface. A ROM memory 92 is used to store the firmware which operates the digital processor 86.

The components of the processor section 38 are interconnected through a data bus 94, which also connects to the timing and control section 36 and to the card interface 90.

The sensor 30 is a progressive scan interline image sensor having a noninterlaced architecture, which comprises a two-dimensional array of photosites 30a, e.g. photodiodes, arranged in rows and columns of image pixels, and a plurality of vertical registers 30b adjacent photosite columns for transferring rows of image pixel charge from the photosites 30a to a horizontal register 30c for readout responsive to clock signals from the sensor drivers 80. The sensor is overlaid with a color filter, such as the well-known Bayer checkerboard color filter array pattern, as described in U.S. Pat. No. 3,971,065.

By using a progressive scan readout method, the entire image is read out in a single scan. The accumulated or integrated charge for the photodiodes comprising the pixels is transported from the photosites 30a to the light protected vertical (parallel) registers 30b by applying a large positive voltage to the phase-one vertical clock (V1). This reads out every row, or line, into the vertical registers 30b. The image pixel charge is then transported from the vertical registers 30b to the horizontal register 30c by two-phase clocking of the vertical clocks (V1, V2). Because of the color filter array, the image pixels on the sensor are transferred as color image pixels to the horizontal register 30c, which delivers a stream of color pixel signals to the analog gain and sampling circuit 82 by cycling of the horizontal clocks (H1, H2). The color pixel signals are subsequently converted to digital pixel signals in the A/D converter 84.

The camera includes two modes, a "compose" mode and a high quality "still" mode. The user composes the picture by depressing the "zoom in" or "zoom out" buttons 58 or 60, and by adjusting the position of the camera. The focusing and exposure control are done automatically. The "compose" mode images from the CCD sensor 30 are processed by an image statistics section 96 of the timing and control ASIC 36, and used to assist in the automatic focusing and automatic exposure operations. The computed values are downloaded to the digital processor 36, where a firmware algorithm in the ROM 92 decides how to adjust the focus motor 44 via the motor driver interface 50 on the timing and control ASIC 36. The firmware also sets the exposure parameters for the final still capture. This includes setting the final exposure time for the sensor 30, the variable analog gain setting for the amplifier 82 and the f-number of the variable aperture 46, as well as determining whether the charger circuit 76 should be enabled and its flash capacitor charged, and selecting the appropriate quench level for a flash exposure. Other statistics are computed in the image statistics processor 96 and used by the digital processor 86 to adjust the flash control circuit 72 via the bus interface 52 on the ASIC timing and control section 36.

Once the user has composed the image, the still capture button 62 is pressed, and the sensor exposure time begins. The intensity of the image light upon the sensor 30 is regulated by the motor-driven, variable aperture 46, while exposure time is regulated electronically by appropriate clocking of the sensor 30. Meanwhile, if ambient light is insufficient, the flash 64 is fired and quenched. Finally, the still image is read out from the sensor 30, and sensor image data is passed to the processor section 38 through the high speed interface 37 in the timing and control section 36. The digitized still image from the sensor 30 is temporarily stored in RAM memory 88 and is then processed by the processor 86 which executes an image processing software program, stored in ROM 92, in order to produce a high quality digital still image. The processed image is digitally stored on the removable memory card 40.

Figure 4:
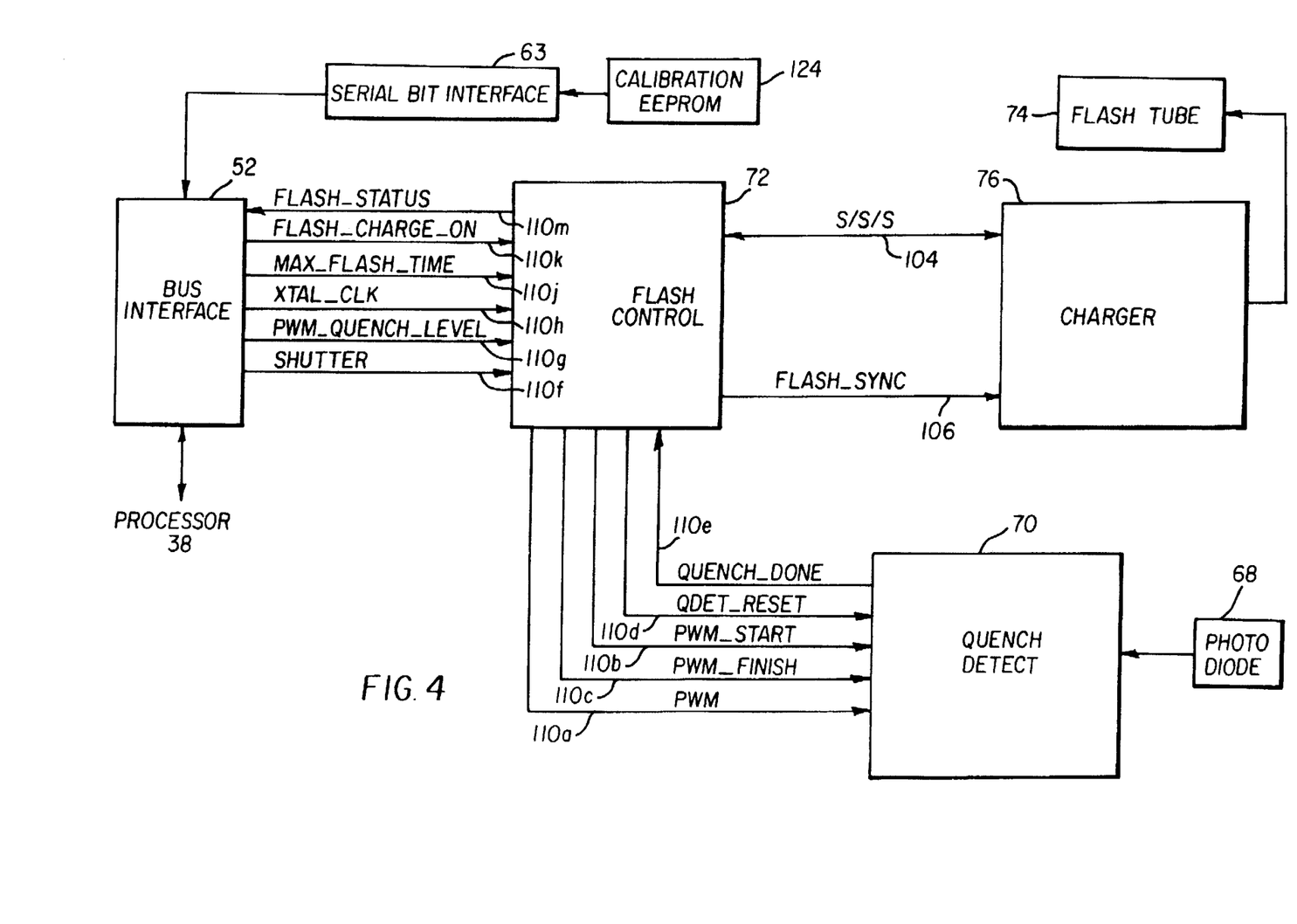
FIG. 4 is a block diagram of the electronics of the quench flash circuit shown in FIG. 3.
Figure 5:
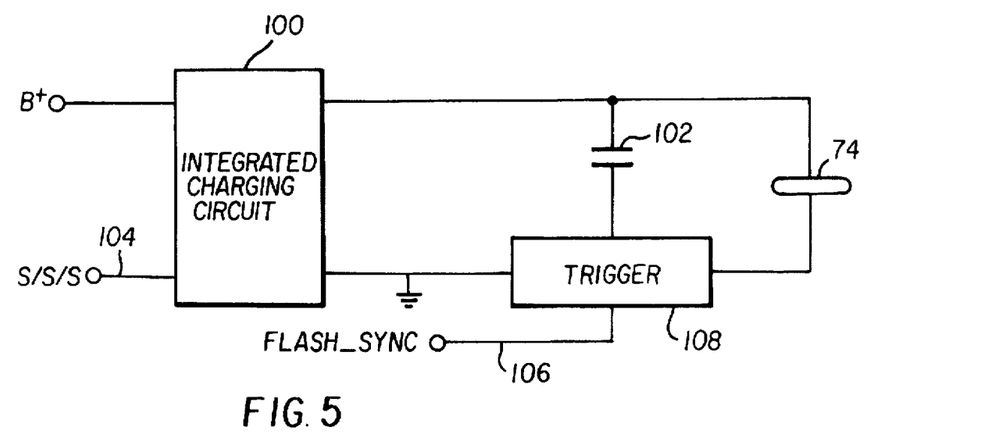
FIG. 5 is a circuit diagram of the flash charger circuit shown in FIG. 4.

FIG. 4 shows a block diagram of the quenched flash system electronics shown in FIG. 3 and the identification of the interface signals passing between the blocks. More specifically, the diagram includes the digital flash control circuit 72, the flash charger circuit 76, and the analog quench detection circuit 70. A simplified block diagram of a typical flash charger circuit is shown in FIG. 5. The flash charger preferably uses an integrated charging circuit 100, such as the DC to DC converter described in U.S. Pat. No. 5,101,335 by Ludden et al, which is assigned to Eastman Kodak Company. The integrated charging circuit 100 charges a flash capacitor 102 in response to a control signal on a "S/S/S" (start, stop, sense) line 104, which is provided by the flash control circuit 72 to the flash charger circuit 76 (when enabled by the flash_charge_on line 110k from the processor 38 via the bus interface 52), as shown in FIG. 4. A flash status line 110m indicates whether or not the flash is fully charged. Once the flash capacitor 102 is charged, it is fired when the flash control circuit 72 drives a flash_sync line 106 high and thereby enables a trigger interface 108 connected between the capacitor 102 and the flash tube 74. The flash is quenched by subsequently dropping the flash_sync line 106 low, which causes the trigger interface 108 to quench the flash tube 74.

Figure 6A:
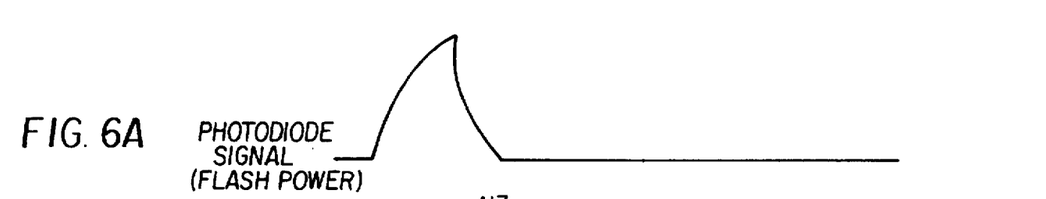
FIG. 6 shows diagrams of the flash light output versus time, and its integral, relative to the quench signal.
Figure 6B:
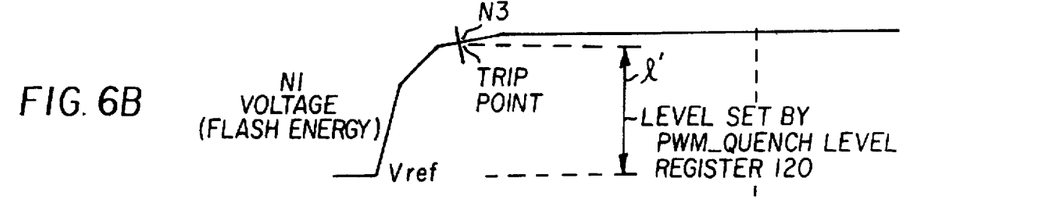
Figure 6C:
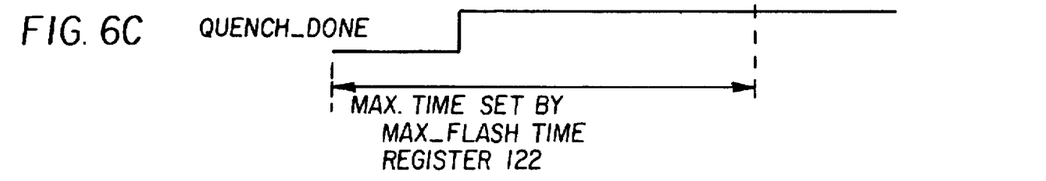

A typical graph of flash light output versus time is shown in FIG. 6A. FIG. 6B also shows the integral of the light output, that is, the voltage N1 produced by the integration of the photodiode signal. In a typical flash unit, the entire flash discharge takes approximately 350 μsec. The light output can be halted or "quenched" prior to this time by bringing the flash_sync line 106 low. This reduces the total flash output energy and thus the image sensor exposure. The flash should be quenched at the precise time that the image sensor has received the proper exposure. In order to do this, the flash control circuit 72 generates the appropriate flash_sync signal needed to halt the flash from a quench_done signal supplied by the quench detect circuit 70. The analog quench detect circuit 70 is shown in greater detail in FIG. 7, with portions in common with FIG. 2 shown with the same reference characters. The analog quench detect circuit 70 includes a pulse width integrator 112 that is controlled from the flash control circuit 72 via a number of lines, including a pulse_width_modulation (PWM) line 110a, and a PWM_start line 110b. A PWM_finish line 110c controls application of the integrated signal to a sample/hold circuit 114, and a qdet_reset line 110d is connected to the light integrator 18. The quench circuit 70 returns a quench_done signal to the flash control circuit 72 on a quench_done line 110e when the image sensor has received the proper exposure.

Referring to FIGS. 3, 4, 5, and 7 in combination, the flash quench process begins when the operator depresses the shutter button 62, which asserts a signal on a shutter line 110f that is applied to the input of the flash control circuit 72. This in turn causes the flash control circuit 72 to assert a signal on the qdet_reset line 110e, which closes the reset switch 20 within the quench detect circuit 70 and thereby initiates an integration cycle. The quench detect circuit 70 monitors the incoming light being reflected off the focused object onto the photodiode 10, resulting in a measurable current across the diode 10. The corresponding current is then integrated by the integrator 18 within the quench detect circuit 70 to provide the signal N1 (also shown in FIG. 6B).

The integrated voltage N1 is compared in the comparator 22 to a programmable DC reference (trip point) voltage N3 in order to generate, when N1 equals or exceeds N3, a quench_done signal that is outputted back to the flash control circuit 72 on the quench_done line 110e. The value of the DC reference voltage N3 is dependent upon a pulse width modulation signal PWM sent from the flash control circuit 72 on the PWM line 110a to a switch 111 in the quench detect circuit 70. The pulse width of the PWM signal consequently determines the closure time of the switch 111 and the output voltage that the integrator 112 reaches during integration. The pulse width of the PWM signal is a function of a flash quench calibration setting stored in a calibration EEPROM 124 (see FIG. 3). In particular, the ROM 92 stores a firmware program which indicates the appropriate PWM duty cycle for each camera lens f-number and programmable analog gain setting. The PWM duty cycle values stored in the ROM 92 are appropriate for "reference" or "aim" quench conditions for the circuit of FIG. 7. The calibration EPROM 124 preferably stores a single flash quench circuit calibration value that adjusts for the difference between the "reference" circuit conditions and the actual circuit values. This calibration value is a multiplicative correction factor which the processor 86 uses to scale the PWM duty cycle values stored in the ROM 92. For example, if the stored duty cycle value of 20% is appropriate for a particular f-number and gain setting "aim" circuit value, and the flash calibration value stored in EPROM 124 equals 1.1, then the corrected PWM value equals 22%.

Figure 7:
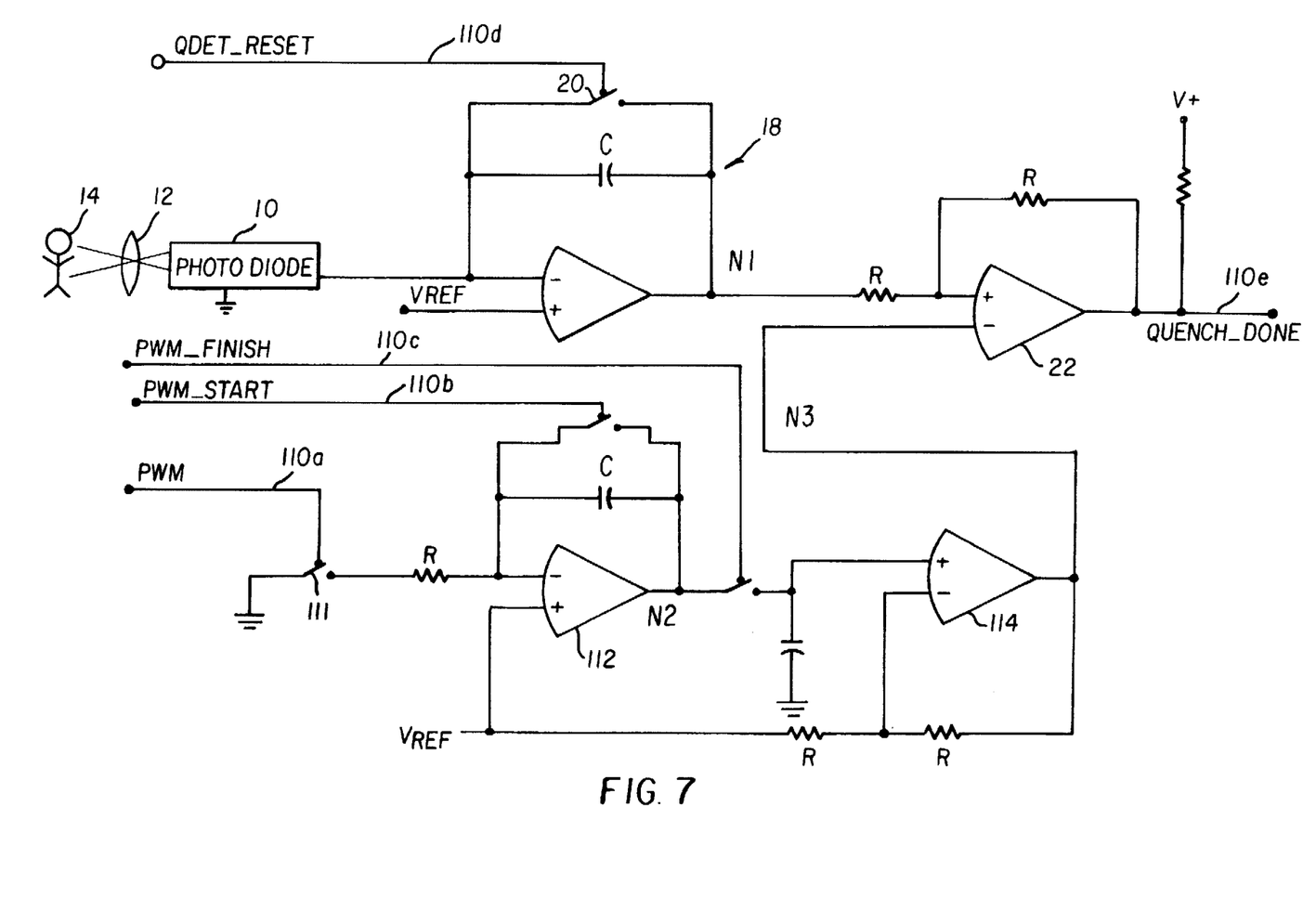
FIG. 7 is a circuit diagram of the analog quench detect circuit shown in FIG. 4.

According to this example, a value=Round [(22/100)× 256]=56 is therefore stored in the flash control circuit 72 by processor 86. A different camera would have a different quench circuit calibration value (for example 0.9) stored in EPROM 124 but the same duty cycle values stored in the ROM 92. The quench calibration value stored in the EPROM 124 is determined and programmed when the flash quench circuit of FIG. 7 is tested during the manufacturing process. The single calibration value corrects for any responsivity variations of the photodiode 10, resistors (R) and capacitors (C), and reference voltage $V_{REF}$ shown in FIG. 7. The pulse width modulator setting is applied to the flash control circuit 72 through the serial bit interface 63 and the bus interface 52 via a PWM_quench_level line 110g and stored in a register. The clock used to generate the pulse width modulating signal PWM is a 256 kHz rate clock derived from a xtal_clk line 110h applied to the flash quench control 72.

Figure 9A:
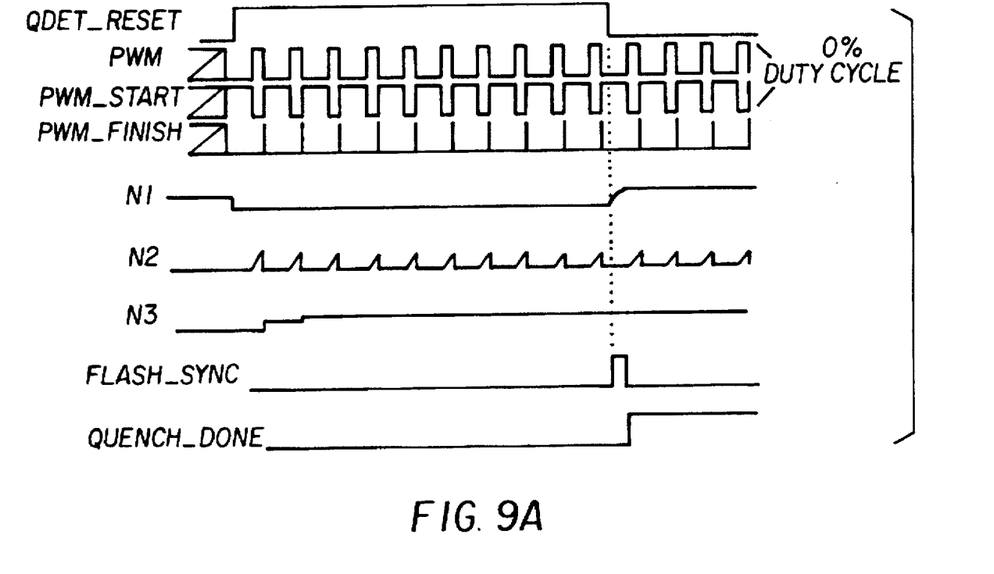
FIGS. 9A and 9B shows timing waveforms generated by the digital flash control circuit shown in FIG. 8, and the interrelationship of some of the interface signals shown in FIG. 4.
Figure 9B:
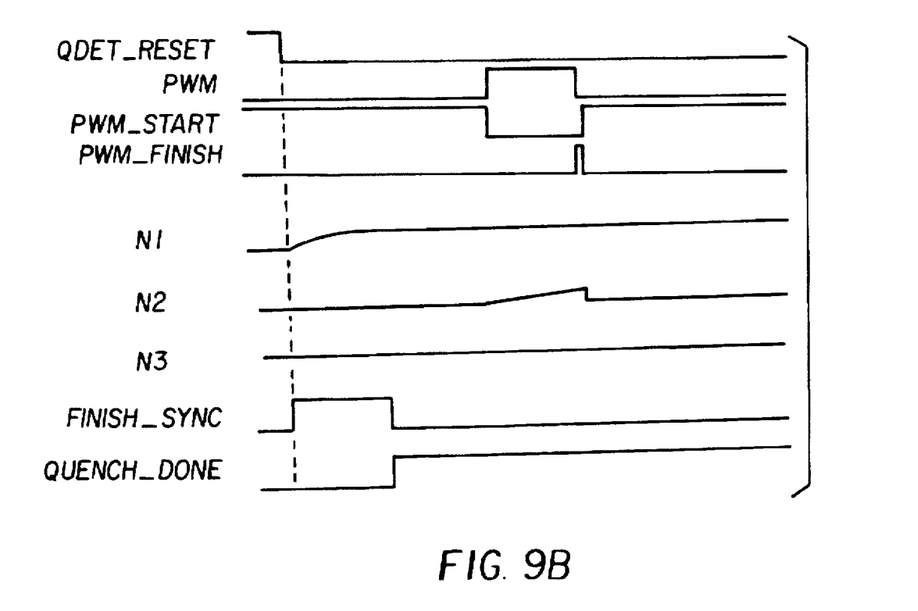

The interrelationship of the interfacing signals is seen in the waveform diagrams of FIGS. 9A and 9B, where FIG. 9B shows a magnified view of the waveforms during the quench period. Upon de-assertion of the signal on the qdet_reset line 110d (occurring when the signal on the shutter line 110f asserts high), the signal on the flash_sync line 106 remains high until the quench operation is completed (the signal on the quench_done line 110e is asserted), or until a flash time out occurs. The latter condition can occur when the signal on the quench_done line 110e never asserts from the quench detect circuit 70 because, e.g., the subject is out of range of the flash. In this case, the flash control circuit 72 asserts a programmable quench_timeout signal which internally gates with the signal on the quench_done line 110e to force an end to the flash operation by setting the flash_sync line 106 low. The quench_timeout signal is itself programmable via a value from the processor 86, which may be a function of a calibration value from the calibration EPROM 124, and which is applied to the flash control circuit 72 on a max_ flash_time line 110j.

Depending on the DC voltage reference established by the pulse width modulation signal PWM, the flash_sync region (the period of signal assertion on the flash_sync line) can range from approximately 5 μs to 300 μs, under normal operating conditions. Many different quench levels (256 in this example) can be created by setting an approximately 1 KHz PWM signal to have different duty cycles. For example, setting the PWM signal on the PWM line 110a to have a 25% on duty cycle gives a quench level of 25% of the maximum quench level, a 50% on duty cycle would give a quench level of 50% of the maximum level, and so on. The PWM signal is converted to an analog voltage via the pulse width integrator 112, which integrates an output signal during the on duty cycle time of the PWM signal. The configuration of the circuit 112 also insures that the analog quench level is independent of the PWM signal high and low output voltage levels of the flash control circuit 72.

Figure 8:
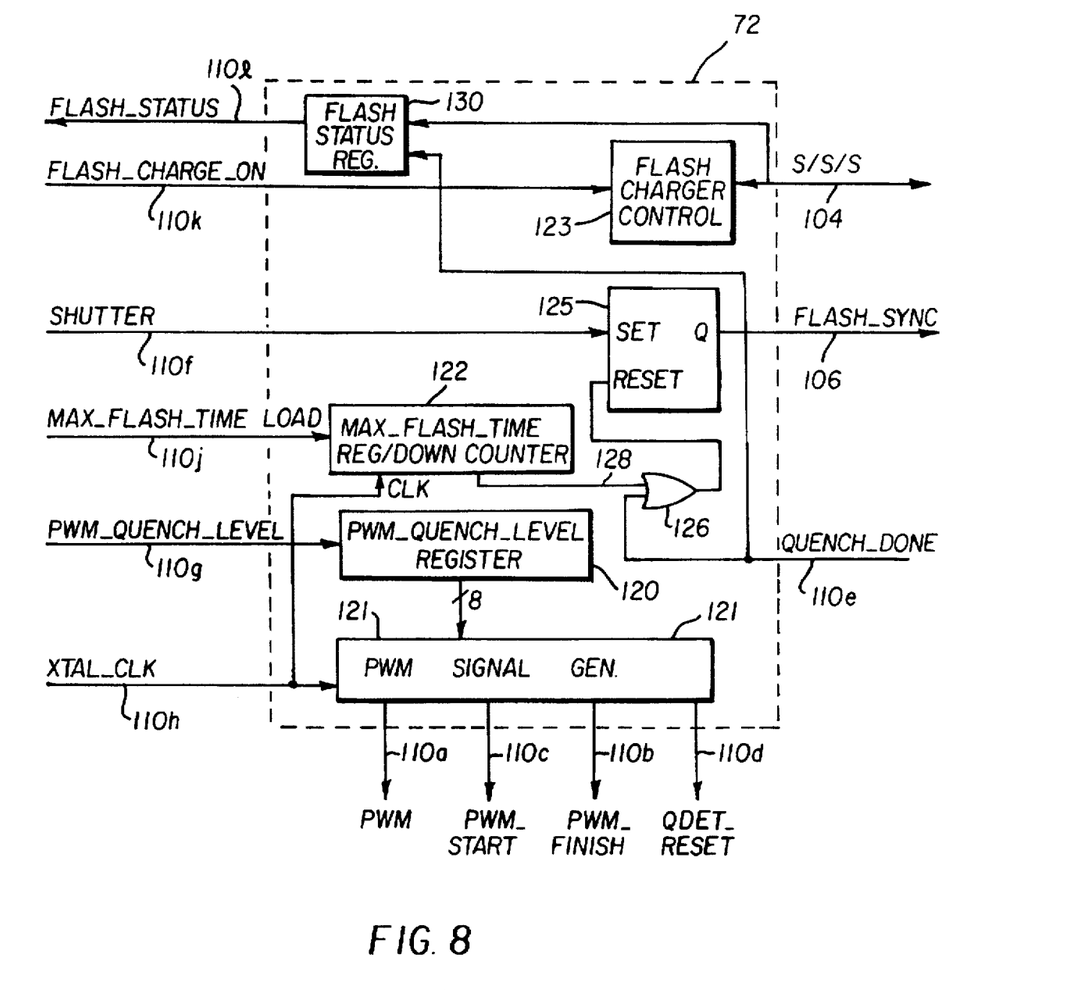
FIG. 8 is a diagram of the digital flash control circuit shown in FIG. 4.

A diagram of a typical functional implementation of the flash control circuit 72 is shown in FIG. 8. The circuit includes two 8-bit registers: a PWM_quench_level register 120, which controls the PWM duty cycle via a PWM signal generator 121 and a max_flash_time register/down counter 122, which sets the maximum flash time for a particular exposure; and a flash charger control circuit 123, which enables the charger circuit 76. The PWM signal generator 121 controls the PWM duty cycle pursuant to the PWM_quench_level register value loaded from the bus interface 52. As heretofore described, the PWM_quench_level is determined by scaling the PWM duty cycle values stored in the ROM 92 with the flash quench circuit calibration value stored in the EEPROM 124. As a result, the PWM signal thus sets the N3 voltage as shown in FIG. 7 by controlling the integration time of the pulse width integrator 112. As shown in FIG. 6B, the integrator 112 generates a trip point voltage N3 corresponding to a level '1' set by the PWM signal. When the voltage N1 equals the trip point voltage N3, that is, at the point N3 in the waveform shown in FIG. 6B, the quench_done signal 110d is raised high, and that condition is communicated back to the flash control circuit 72.

The flash_sync signal 106 is controlled by an R/S flip-flop 125. The flash is fired as the shutter line 110f is asserted, thus setting the Q output of flip-flop 125 and setting the flash_sync signal 106 high. The flash is quenched when the output of OR gate 126 is set high, thus resetting flip-flop 125 and setting the flash-sync signal 106 low. The OR gate 126 is set high when either the quench_done signal 110e is asserted, or the quench_timeout signal is asserted on a quench_timeout line 128 when the max_flash_time register/down counter 122 counts down from its initial max_flash_time value to an all-zeros value (which happens in a time period equal to the initial register/counter value times the clock period of the xtal_clk supplied on line 110h).

Because the PWM_quench_level signal on line 110g is 8 bits, 256 possible N3 quench levels are possible (based on a duty cycle range of 1/256 to 256/256). This allows the quench levels to be set very precisely. According to the invention, the calibration to compensate for manufacturing variations in sensitivity of the photodiode or amplifier gains can be done simply by using a different PWM_quench_level value. The final PWM_quench_level values for such manufacturing variations, and for any given zoom lens aperture or gain setting, may be stored in the calibration EEPROM 124 shown in FIG. 3. Alternately, in the preferred embodiment the EEPROM 124 stores one or more correction values for manufacturing variations, which are used by the processor 86 to compute the final PWM_quench_level values for the present lens aperture and gain setting based on the duty cycle values stored in the ROM 92. The values in the EEPROM 124 are communicated to the processor 86, through the serial bit interface 63. The processor communicates the final PWM_quench_level values via the bus interface 52 to the flash control circuit 72.

The max_flash_time register/counter 122 controls the maximum flash time according to the max_flash_time signal coming from the bus interface 52. If the maximum flash time is reached before N1>N3, the flash is quenched. Besides situations in which the subject is out of range of the flash, this allows the flash to be precisely controlled in situations where the subject distance is known, and therefore the amount of flash is a predetermined value. The subject distance can be determined automatically by the lens autofocus algorithm, or alternately can be manually input by the user. The required flash energy versus subject distance is inversely proportional to the graph shown in FIG. 1. For example, the max_flash_time value used for a subject at 12 feet should provide about 4 times the flash output energy of the max_flash_time value used for a subject at 6 feet. Note that the max_flash_time values are nonlinearly related to the flash energy, as shown in the curve of FIG. 6B. The flash time out register/counter 122 can thus be set in certain applications to ensure consistent exposures when multiple pictures are taken at the same distance, even if the subjects are wearing clothing with very different average reflectance values, for example.

Alternatively, the max_flash_time register 122 can be set to its maximum value, and the pulse PWM_quench_level register 120 can be set so that the flash is quenched when the integrated light signal N1 exceeds the programmed PWM value due to light reflected from the subject. If the integrated light signal N1 never exceeds the N3 value, for example because the subject is too far away from the camera, the quench_done signal 110e will never be generated. This condition is latched in the flash status register 130 and transferred from the flash control circuit 72 to the processor section 38 via flash status line 110m and bus interface 52, so that the processor 86 (FIG. 3) can optionally generate a warning signal (for example via an LWD or LCD display) that the flash power was inadequate to properly expose the subject.

The timing waveforms generated by the PWM signal generator 121 are shown in FIGS. 9A and 9B. When the qdet_reset pulse 110d is high, the quench photodiode integrator 18 is reset. The PWM 110a and PWM_start pulse 110b widths vary depending on the value of the PWM_quench_level register 120. The value of the integrated voltage N2 depends only on the width of these two pulses, not the voltage of their logic levels (i.e., the N2 voltage is independent of whether the "1" or high voltage is 3.3 volts or 3.4 volts).

The three signals PWM, PWM_start, and PWM_finish are used by the circuit in FIG. 7 to create a quench detect trip point level N3 that is independent of the digital high and low voltage levels of the signal lines 110a–110d, and depends only on the $V_{REF}$ voltage and resistor and capacitor component values. The PWM signal 110a is a periodic signal with a fixed period and variable duty cycle. The amount of time that PWM is low determines the quench detect trip point level N3. Referring to FIGS. 9A and 9B, a typical cycle is as follows:

| | | |
|---|---|---|
| 1. | PWM goes low | turns off input to integrator 112 |
| 2. | PWM_finish goes high | transfers integrated value to sample and hold 114 |
| 3. | PWM_finish goes low | isolates sample and hold 114 |
| 4. | PWM_start goes high | resets integrator 112 |
| 5. | PWM_start goes low | enables integrator 112 |
| 6. | PWM goes high | integration begins |
| 7 | Go to 1 | |

Once the trip point level N3 is set, qdet_reset is taken low and flash is triggered by bringing flash_sync high. Light is reflected by the scene and falls on the photodiode 10. The photocurrent is integrated by integrator 18 and the result is compared to the trip point level N3 set by the PWM circuit. When the integrated value reaches the trip point the quench_done signal is taken high. This signals the flash control circuit 72 to quench the flash output by bringing the flash_sync line 106 low.

If the max_flash_time down counter 122 reaches count zero before the integrated photodiode signal N1 reaches the trip point level N3, the flash_sync line 106 is brought low. Thus, the flash output can be controlled by setting the flash time via the max_flash_time register/counter 122 if the trip point level N3 is set to a sufficiently high level.

The invention has been described with reference to a preferred embodiment. However, it will be appreciated that variations and modifications can be effected by a person of ordinary skill in the art without departing from the scope of the invention.

PARTS LIST 10 photodiode
12 lens
14 subject
16 flash
18 integrator
20 reset switch
22 comparator
24 EEPROM memory
26 D/A converter
28 microprocessor
30 CCD image sensor
30a photosites
30b vertical register
30c horizontal register
32 zoom lens
34 viewfinder
36 timing and control section
37 high speed interface
38 processor section
40 memory card
42 zoom motor
44 focus motor
46 variable aperture
48 aperture motor
50 motor driver interface circuit
52 bus interface
54 status display
56 user control section
58 zoom in button
60 zoom out button
62 capture button
63 serial bit interface
64 flash unit
66 lens
68 photodiode
70 quench detect circuit
72 flash control circuit
74 flash tube
76 charger circuit
78 sensor timing circuit
80 sensor drivers
82 analog gain and sampling circuit
84 A/D converter
86 digital processor
88 RAM
90 memory card interface
92 ROM
94 data bus
96 image statistics section
100 integrated charging circuit
102 flash capacitor
104 s/s/s line
106 flash sync line
108 trigger interface
110 PWM line
111 switch
112 pulse width integrator
114 sample/hold
120 PWM_quench_level register
121 PWM signal generator
122 max_flash_time register/down counter
123 flash charger control circuit
124 calibration EEPROM
125 R/S flip-flop
126 OR gate
128 timeout line
130 flash status register

What is claimed is:

1. A flash quench controller for a camera having a flash unit, said controller comprising:

a light detector for producing a signal;

an integrator for integrating the signal from the detector and producing an integrated signal;

a comparator for comparing the integrated signal to a reference value;

means for quenching the flash unit when the integrated signal reaches the reference value;

means for storing a plurality of digital values; and means for programmably setting the reference value using a pulse signal having a variable pulse width, wherein the pulse width of the pulse signal is determined from one or more of the stored digital values and accordingly is used to vary the reference value.

2. The controller as claimed in claim 1 wherein the signal pulse width is converted to an analog voltage using a circuit that is independent of a voltage level of the pulse.

3. The controller as claimed in claim 1 wherein the means for programmably setting the reference value includes an integrator for generating an analog voltage by integration of the pulse signal.

4. A flash quench controller for a camera having a flash unit, said controller comprising:
  a light detector for producing a signal;
  an integrator for integrating the signal from the detector and producing an integrated signal;
  a comparator for comparing the integrated signal to a reference value;
  means for quenching the flash unit when the integrated signal reaches the reference value;
  means for storing a plurality of digital values; and
  a programmable circuit including an integrator responsive to one or more stored digital values for setting the reference value.

5. The controller as claimed in claim 4 wherein the programmable circuit is responsive to a digital signal having a variable pulse width, wherein the pulse width of the digital signal determines the output of the integrator, thereby varying the reference value.

6. The controller as claimed in claim 5 wherein the digital signal pulse width is converted to an analog voltage using a circuit that is independent of a voltage level of the digital signal.

7. A flash quench controller for a camera having a flash unit, said controller comprising:
  a light detector for producing a signal;
  an integrator for integrating the signal from the detector and producing an integrated signal;
  a comparator for comparing the integrated signal to a reference value;
  means for quenching the flash unit when the integrated signal reaches the reference value;
  means for storing a plurality of digital values;
  a signal generator for generating a pulse signal having a variable pulse width in response to one or more stored digital values; and
  means responsive to the pulse signal for programmably setting the reference value, wherein the pulse width of the pulse signal determines an amplitude level of the reference value.

8. The controller as claimed in claim 7 wherein the signal pulse width is converted to an analog voltage using a circuit that is independent of a voltage level of the pulse.

9. The controller as claimed in claim 7 wherein the means for programmably setting the reference value includes an integrator for generating an analog voltage by integration of the pulse signal.

10. A flash quench controller for a camera having a flash tube, said controller comprising:
  a light detector;
  means for integrating a signal from the light detector;
  means for comparing the integrated signal to an analog reference value;
  means for quenching the flash tube when the integrated signal exceeds the analog reference value;
  means for storing a plurality of digital values;
  means responsive to the stored digital values for generating a digital signal having a programmable pulse width; and
  means for programmably setting the analog reference value by using the pulse width of the digital signal to vary the analog reference value.

11. The controller as claimed in claim 10 wherein the means for programmably setting the analog reference value includes an integrator.

12. The controller as claimed in claim 10 wherein the digital signal pulse width is converted to an analog voltage using a circuit that is independent of a voltage level of the digital signal.

13. A method for quenching a flash tube in a camera having a flash unit, said method comprising the steps of:
  detecting the level of the incident light and generating a light signal therefrom;
  integrating a integration signal from the light signal;
  storing a plurality of digital values;
  generating a digital signal, responsive to the stored digital values, having a programmable pulse width;
  generating an analog reference value responsive to the pulse width of the digital signal;
  comparing the integration signal to the analog reference value; and
  quenching the flash tube when the integrated signal exceeds the analog reference value.

14. The method as claimed in claim 13 wherein the step of generating an analog reference value includes integrating the digital signal.

15. A flash quench controller for a camera having a flash tube, said controller comprising:
  a light detector;
  means for integrating a signal from the light detector;
  means for comparing the integrated signal to a reference value;
  means for storing a maximum flash time value;
  means for generating a maximum flash time value appropriate for a particular flash situation;
  means for inputting the maximum flash time value into said means for storing; and
  means for quenching the flash tube when the integrated signal exceeds the reference value or the flash time exceeds the maximum flash time value input to said means for storing.

16. A flash quench controller for a camera having a flash tube, said controller comprising:
  a light detector;
  means for integrating a signal from the light detector;
  means for comparing the integrated signal to a reference value;
  means for quenching the flash tube when the integrated signal exceeds the reference value;
  means for storing a plurality of standard reference values suitable for different particular camera settings and a calibration value for a particular camera and its flash quench controller; and
  means for programmably setting the reference value by first selecting a standard reference value for a particular camera setting and subsequently modifying the standard reference value using the stored flash quench controller calibration value.

* * * * *

UNITED STATES PATENT AND TRADEMARK OFFICE
CERTIFICATE OF CORRECTION

PATENT NO. : 5,682,562
DATED : October 28, 1997
INVENTOR(S) : Seiichi Mizukoshi, et al It is certified that error appears in the above-identified patent and that said Letters Patent is hereby corrected as shown below:

On the title page: Item [62] --Reference is made to and priority claimed from U.S. Provisional application Ser. No. 60/006,528, filed 13 November 1995, entitled DIGITALLY CONTROLLED QUENCH FLASH CIRCUIT --.

Signed and Sealed this

Third Day of February, 1998

Attest:

BRUCE LEHMAN

Attesting Officer

Commissioner of Patents and Trademarks